US007543704B2

(12) United States Patent
Miller

(10) Patent No.: US 7,543,704 B2
(45) Date of Patent: Jun. 9, 2009

(54) MULTI-FUNCTIONAL WORK CENTER

(75) Inventor: Norma Jean Miller, 13267 Wintergreen Estates, Fenton, MO (US) 63026

(73) Assignee: Norma Jean Miller, Fenton, MO (US)

( * ) Notice: Subject to any disclaimer, the term of this patent is extended or adjusted under 35 U.S.C. 154(b) by 230 days.

(21) Appl. No.: 11/167,477

(22) Filed: Jun. 27, 2005

(65) Prior Publication Data

US 2006/0289320 A1 Dec. 28, 2006

(51) Int. Cl.
*B65D 85/20* (2006.01)
*A47B 3/10* (2006.01)
*B62B 1/00* (2006.01)

(52) U.S. Cl. ....................... 206/373; 190/11; 190/18 A; 280/47.26; 312/241

(58) Field of Classification Search ......... 206/372–373; 190/11, 18 R, 900, 18 A; 312/241; 280/47.19, 280/47.26, 47.34–47.35
See application file for complete search history.

(56) References Cited

U.S. PATENT DOCUMENTS 1,421,929 A 7/1922 Floreskul
1,426,962 A 8/1922 Corpstein
2,277,435 A 3/1942 Howe
2,522,322 A 9/1950 Wallace
2,609,072 A 9/1952 Levinson
2,739,863 A 3/1956 Ferris
2,786,500 A 3/1957 Unterfranz
3,304,891 A 2/1967 Rachman
3,483,954 A * 12/1969 Michalski .................. 190/106
4,034,518 A 7/1977 Trecker
4,049,091 A 9/1977 Chubb
4,131,327 A 12/1978 Marshall et al.
4,187,785 A 2/1980 Juh
4,244,632 A * 1/1981 Molinari .................. 190/18 R
4,378,828 A 4/1983 Shiminski
4,404,915 A 9/1983 Simpson
4,515,493 A * 5/1985 Radovich ..................... 190/11
4,595,086 A 6/1986 Simpson
4,852,498 A * 8/1989 Judd ........................... 190/11
4,856,627 A * 8/1989 Polatov ....................... 190/11
5,339,956 A * 8/1994 Thomason .................. 306/372
5,357,872 A 10/1994 Wilmore (Continued)

OTHER PUBLICATIONS

POLATOV Figure 2 identifying the unnumbered supplementary utility portion securing assembly.*

*Primary Examiner*—Bryon P Gehman
(74) *Attorney, Agent, or Firm*—Harness, Dickey & Pierce, P.L.C.

(57) ABSTRACT

The present invention encompasses both apparatuses and methods for providing capabilities of facilitating utilitarian functions that are flexible in both their configuration and circumstances of utilization. In various embodiments, this multi-functional utility system is capable of being manually transportable, compactable, customizable, and is capable of operation in a variety of settings. In certain representative embodiments, the present invention includes folding legs, a base utility portion, a supplementary utility portion that is moveable relative to the base utility portion, and an assembly for arresting the motion of the supplementary utility portion, relative to the base utility portion. The supplementary utility portion is capable of assuming at least one closed disposition and at least one operative disposition, wherein the operative disposition is oriented at an angle between 0 and 180 degrees relative to the orientation of the supplementary utility portion when in the closed disposition.

9 Claims, 6 Drawing Sheets

U.S. PATENT DOCUMENTS

| | | | | |
|---|---|---|---|---|
| 5,366,071 | A * | 11/1994 | Laszlo | 206/218 |
| 6,039,416 | A | 3/2000 | Lambert | |
| 6,068,355 | A * | 5/2000 | Thorp | 312/241 |
| 6,113,202 | A | 9/2000 | Germano | |
| 6,170,839 | B1 * | 1/2001 | Kizewski | 280/47.26 |
| 6,189,459 | B1 | 2/2001 | DeAngelis | |
| 6,334,400 | B1 | 1/2002 | Nien | |
| 6,811,006 | B1 * | 11/2004 | Mundle | 190/11 |
| 7,144,020 | B2 * | 12/2006 | Huguet | 280/47.34 |
| 7,278,537 | B2 * | 10/2007 | Lown et al. | 190/11 |
| 2004/0123780 | A1 | 7/2004 | Butt, Jr. | |
| 2006/0037873 | A1 * | 2/2006 | Elgart | 190/11 |

* cited by examiner

MULTI-FUNCTIONAL WORK CENTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to utility systems that are capable of facilitating a multiplicity of utilitarian functions, and more particularly to a utility system that is capable of providing more than one area for facilitating utilitarian functions in an enclosure that is transportable and is capable of assuming both a closed disposition and at least one operative disposition.

2. Related Art

Utility systems that provide a multiplicity of utilitarian functions are well known. Often they attempt to provide a user of the utility system with capabilities that are adaptable to a variety of functions and settings. Among the factors involved in choosing between differing strategies employed in designing these utility systems are whether to specialize the utility system for particular projected uses or to generalize the utility system's capabilities to enhance its flexibility of application. Additional factors that can affect design decisions are the settings for use, transportation issues, positioning requirements, ease of use, adaptability between specialized uses, and storage needs.

A variety of approaches have been attempted, encompassing both varying degrees of specialization and varying degrees of flexibility. Often, the prior approaches have incorporated a base utility section that can serve as a work bench, a closure that can be closed to enable the work bench and any included equipment to be secured and/or transported (commonly also incorporating a handle), and a form of support that can also be folded up for ease of storage or transportation.

Prior art attempts have also regularly incorporated a main work surface, differing forms of enclosure, storage means for holding supplies or tools, and may also include auxiliary equipment such as a vise. Those that are designed to be portable generally also include a deployable support structure such as folding legs, and a type of clasp to hold the enclosure in a closed position. Often these prior designs take on the appearance of a work bench when in use, and may appear to be a large case if folded for portability.

While such utility systems have provided a measure of assistance in accomplishing various utilitarian functions, the extent of their capabilities have also been limited. Generally, prior utility systems have not provided concurrent capabilities of utilizing both a base utility area and a supplementary utility area, wherein the supplementary utility area is maintainable in a particular disposition that provides the concurrent use capability, as well as capabilities of positioning the utility system for use in impromptu settings and capabilities of compacting the utility system for ease of use and transportation.

SUMMARY OF THE INVENTION

The present invention is a multi-functional utility system that is adaptable for meeting a wide variety of utilitarian purposes, including both those that are specialized in their requirements, as well as those that demand a significant degree of functional flexibility. The present invention incorporates both method and apparatus embodiments. Certain embodiments of the multi-functional utility system are capable of being arranged in specific configurations that are tailored to work best for certain dedicated functions, while other embodiments are arranged with adjustable configurations that are capable of being altered to suit the requirements of one task on one day, and then being altered again another day to suit the requirements of a different task. Among the methods described are those that can be adapted widely, as well as those that are best tailored to suit specific functions. In the description of the present invention herein, certain terms are intended to have specific meanings, and these terms and their specific meanings will be detailed were appropriate. One term used with a specific meaning herein is the term "utilitarian function", wherein the specific meaning intended is its entire normal and full range of meanings, with only a few limited exceptions. These few limited exceptions refer only to actions that exclusively involve the storing, transporting, or positioning of the multi-functional utility system, per se.

The present invention is characterized by a number of qualities. Among its cardinal features are the providing of at least one base utility portion and at least one supplementary utility portion. Both the base utility portion and the supplementary utility portion include at least one utility area each, and the multi-functional utility system provides concurrent capabilities of utilizing the base utility area and the supplementary utility area. The utility areas are characterized by their capabilities of facilitating the performing of utilitarian functions, when the multi-functional utility system is in use for performing utilitarian functions. The base utility portion and the supplementary utility portion are movably interrelated, with the interrelation taking the form of a pivoting hinge in certain embodiments. The base utility portion will generally first be situated in a disposition suitable for facilitating at least one utilitarian function, and the supplementary utility portion will then be moved from a closed disposition to an operative disposition. The operative disposition of the supplementary utility portion is at an orientation between 0 and 180 degrees relative to its closed disposition. A securing assembly arrests the motion of the supplementary utility portion in the operative disposition, so that both the base utility portion and the supplementary utility portion are concurrently available for facilitating utilitarian functions.

Many embodiments of the multi-functional utility system will also incorporate a support structure that provides capabilities of positioning the multi-functional utility system for use. In several of these embodiments, the support structure will be selectively deployable. The support structure's selective deployability provides the capabilities of either electing to deploy the support structure and thereby enable positioning the multi-functional utility system in a condition which is suitable for facilitating utilitarian functions, or electing to switch the support structure from the deployed to the not deployed condition which is suitable for transportation or storage. The means by which the support structure positions the multi-functional utility system, the means by which the support structure operates, as well as the means by which it can be selectively deployed are all widely variable. The specific details of how the support structure accomplishes these means of positioning, operating, or deploying, in and of themselves, are not the subject of the present invention, but the combination of these means with the other aspects of the multi-functional utility system are within the scope of the present invention. Hence, it should be understood that the present invention encompasses any means by which the described positioning, operating, or deploying functions can be effected, when combined with the cardinal features of the multi-functional utility system. The means of positioning, operating, or deploying the support structure can be either manually or power operated. These means that are encompassed, when combined with the cardinal features, can include, but are not limited to, legs, which may be folding or telescoping; wheels; treads; skids; and any other appropriate form of transporting apparatus. Certain embodiments of the multi-functional utility system will also incorporate a handle for ease of transportation.

The range of contents and means of facilitating utilitarian functions of the multi-functional utility system are essentially unlimited. These contents and means can include, but are not limited to, tools, work surfaces of varying designs and constructions, storage containers, supplies of materials, power supplying means, illuminations sources, tethering and clamping means, powered equipment, and any other form of equipment that is capable of providing a utilitarian capability. Additional means of facilitating utilitarian functions encompassed by the present invention are measurement facilitating capacities that provide the capability of utilizing an attribute of the multi-functional utility system to effect a measurement, and a capacity for integrating a "tool" form of capability into the multi-functional utility system, wherein said "tool" capability is often encountered as a separate entity in utilitarian circumstances unconnected with the present invention, such as providing a socket holding element that can connect with a plurality of differing size sockets for turning nuts or bolts. It is further within the scope of the present invention that the integrated tool capacity can also provide the capability of functioning separately from the multi-functional utility system. It should also be understood that a separated constituent of the multi-functional utility system, when that separated constituent is considered in combination with the remaining constituents of the multi-functional utility system, is encompassed by the scope of the present invention.

A first object of the multi-functional utility system is to provide a user with the capability of selectively locating a utility system where and when required, without the need for additional infrastructure, such as a building to situate the utility system within. A second object of the multi-functional utility system is to provide a user with the capability of selectively configuring a mobile utility system. A third object of the multi-functional utility system is to provide a user with the capability of readily transporting and deploying a utility system. A fourth object of the multi-functional utility system is to provide a user with the capability of selectively adapting a utility system to facilitate a multitude of diverse tasks with differing requirements. A fifth object of the multi-functional utility system is to provide a user with the capability of reconfiguring the same utility system to suit differing task requirements. A sixth object of the multi-functional utility system is to provide a user with the capability of utilizing a readily available utility system that also can readily be configured to secure and protect the contents of the utility system. Other objects and features will be in part apparent and in part pointed out hereinafter.

DETAILED DESCRIPTION OF THE PREFERRED EMBODIMENTS

In the following description, identical numbers indicate identical elements. Where an element has been described in one Figure, and is unaltered in detail or relation in any other Figure, said element description applies to all Figures.

Figure 1:
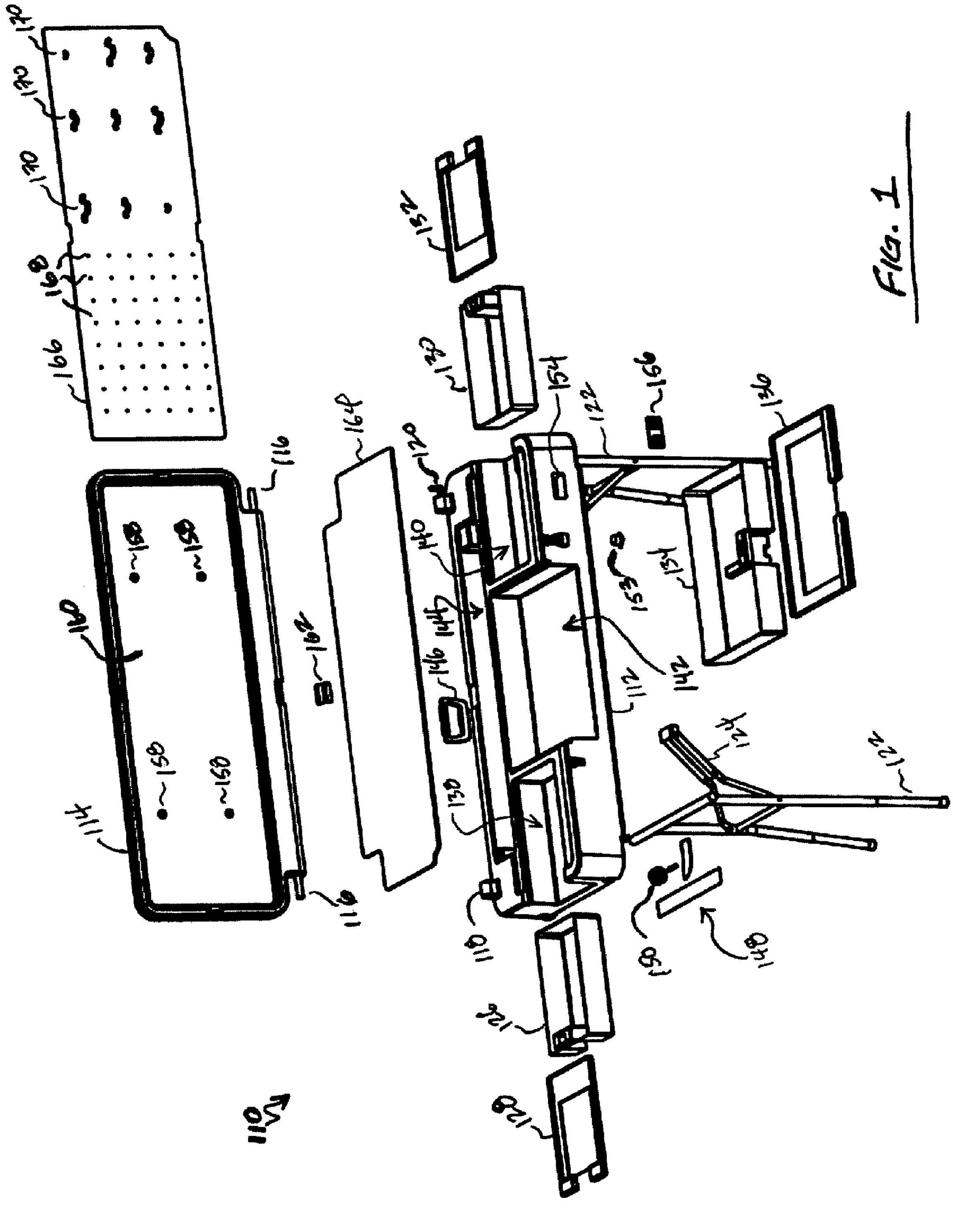
FIG. 1 depicts an exploded perspective view of a first embodiment of the multi-functional utility system.

In FIG. 1 a first embodiment 110 of the multi-functional utility system is shown in an exploded view. The orientation of the first embodiment 110 as shown in FIG. 1 will be a reference frame for the directions and relative position descriptions that follow, since this will be the most common manner in which a user will interact with the first embodiment 110 when it is in its operative disposition. Consequently, the side of the first embodiment 110 facing a viewer of FIG. 1 will be referred to as the front and the opposite side will be referred to as the back; the side with the folding legs will be referred to as the bottom and the opposite side will be referred to as the top (these directions will also be used to refer to the supplementary utility portion, once the disposition of the supplementary utility portion relative to the base utility portion is specified first). Finally, the side of the first embodiment 110 to the viewer's left will also be referred to as the left side, and the opposite side will be referred to as the right.

Primary parts of the first embodiment 110 are a base utility portion 112 and a supplementary utility portion 114. The base utility portion 112 and the supplementary utility portion 114 are pivotally interrelated with a supplementary utility portion axle 116 rotating in base utility portion axle housings 118. A pivot control lever 120 component of the right axle housing 118 provides the capability of selectively arresting the rotation of the supplementary utility portion 114 about the axle 116 when the supplementary utility portion 114 is in an operative disposition. Folding legs 122 serve as a support structure for the first embodiment 110. Each folding leg 122, when unfolded, is reinforced by a brace 124.

Both the base utility portion 112 and the supplementary utility portion 114 can assume a variety of configurations, with the particular aspects of the embodiment depicted in FIG. 1 describing only a representative configuration for purposes of illustration, and is not to be construed as limiting of the variety of the configurations that fall within the scope of the present invention. The left side of the base utility portion 112 receives a sliding drawer 126 and a drawer lid 128. The right side of the base utility portion 112 receives a sliding drawer 130 and a drawer lid 132 that can serve both as a work surface and a cover for the contents of drawer 130. A center drawer 134 and a drawer lid 136 that can serve both as a work surface and a cover for the contents of drawer 134 are received in the center of the front side of base utility portion 112. Any of the drawers 126, 130, and 134 or drawer lids 128, 132, and 136 can be provided with stops (not shown) capable of holding the drawers or lids both at selected degrees of extension as well as unextended. Additionally, any of the drawers 126, 130, and 134 or drawer lids 128, 132, and 136 are capable of being removable from the base utility portion 112, either individually or in combination. Moreover, any of the drawers 126, 130, and 134, either individually or in combination, are capable of being separated from the base utility portion 112 while their corresponding drawer lids 128, 132, and 136, respectively, can remain associated with the base utility portion 112. Alternatively, any of the drawer lids 128, 132, and 136, either individually or in combination, are capable of being separated from the base utility portion 112, while their corresponding drawers 126, 130, and 134, respectively, can remain associated with the base utility portion 112. Optionally, the base utility portion 12 and the drawers 126, 130, and 134, as well as the drawer lids 128, 132, and 136 are capable of being used when any permutation of the drawers 126, 130, and 134 are partially extended from the base utility portion 112 and/or the drawer lids 128, 132, and 136 are partially extended from the drawers 126, 130, and 134 and/or the base utility portion 112. For example, an artist may configure the multi-functional utility system as a mobile art studio workbench. The drawer lid 128 could then serve as a palette for oil paints, the tubes of which are kept in drawer 126. The drawer 126 could be extended halfway from the base utility portion 112, and the drawer lid 128 could be extended another quarter of the way past the left edge of the drawer 126. The artist would then be able to mix paints on the drawer lid 128, needing only to reach into the drawer 126 next to the drawer lid 128 (now functioning as a palette) to access another tube to add to the palette.

The drawers 126, 130, and 134 are received in base utility portion openings 138, 140, and 142, respectively. The base utility portion openings 138, 140, and 142 are also capable of being configured to provide utilitarian functions as well. For example, the side and bottom surfaces of the base utility portion openings 138, 140, and 142 can be given specialized surface treatments (not shown) that have utilitarian functions. In the case of the artist example described previously, the bottom of the base utility portion opening 138 can serve as a secondary palette, to increase the available space for mixing paints, or can be provided with an absorbent surface to aid in the removal of paint from a brush. Another base utility portion opening 144, disposed behind the base utility portion opening 142, provides additional space for storage or configuration for other utilitarian functions.

It should also be understood that the descriptions of the configurations and the utilitarian functions capable of being performed by the base utility portion 112 also apply to the supplementary utility portion 114. Although the supplementary utility portion 114, as depicted in FIGS. 1-11, is shown as being of substantially lesser thickness than the base utility portion 112, this depiction is only for illustrative purposes, and it is within the scope of the present invention for the supplementary utility portion 114 to be of equal or greater thickness as the base utility portion 114, and as such, the supplementary utility portion 114 could then include equal or greater quantities of equipment, space, or functional capabilities as the base utility portion 112. Furthermore, the present invention is not limited to only a base utility portion 112 and a supplementary utility portion 114, but can include additional utility portions (not shown), that can be interrelated with either the base utility portion 112 or the supplementary utility portion 114 in any permutation or arrangement that is suitable for facilitating utilitarian functions. It should also be understood that the either or both of the base utility portion 112 and the supplementary utility portion 114 are further subdivisible (not shown), and that these subdivisions can also be configured with capabilities of movement relative to each other, so that, for example, the supplementary utility portion 114 can be configured with a centerline folding articulation running from left to right side that allows the supplementary utility portion 112, when in an operative disposition, to further hinge along the side to side centerline and thereby provide a partial hood or screen over the base utility portion 112.

Transportation of the multi-functional utility system 110, when in a closed disposition, can be assisted by use of the handle 146 attached to the rear side of the base utility portion 112. Also, a wheel assembly 148, that includes at least one wheel 150, can be integrated into a lower outside edge (the left, lower outside edge, as depicted in FIG. 1). A grip 152 (depicted in FIGS. 2 & 9) disposed in the lower outside edge opposite the side wherein the wheel assembly 148 is disposed can be grasped to transport the multi-functional utility system 110 by rolling on the wheels 150 similarly to how a large suitcase is often rolled on integral wheels.

A male electrical power connection 153, fitted to the underside of the base utility portion 112, can receive power from an extension cord (not shown) and then route that power through an aperture 154 to an electrical outlet 156 for powering electrical equipment. Either alternatively or additionally, a battery, which would often be rechargeable, can be disposed within the multi-functional utility system 110, in base utility portion opening 144, for example, to provide electrical power through the aperture 154 to outlet 156 when an outside source of electrical power is not available.

The supplementary utility portion 114 can also be configured with holes 158 in its external casing 160 to enable fasteners (not shown) to be passed through the external casing 160. The fasteners can be used to anchor the multi-functional utility system 110 to a surface or structure, when preferred. Alternatively, the holes 158 can also be disposed in the base utility portion 112 (not shown), or can be integrated into the folding legs 122 (not shown). A catch 162 can augment the control of the positioning of the supplementary utility portion 114 by limiting the rearward rotation of the supplementary utility portion 114, were it to swing too far rearward for the conditions in which it is located. The catch 162 can also serve to stabilize the multi-functional utility system 110 by preventing unimpeded rearward momentum of a quickly pivoting supplementary utility portion 114.

A surface insert 164 provides additional utilitarian function capabilities by making available a broad work surface that substantially spans the width and depth of the base utility portion, even though the base utility portion also includes the various other components described above. Additionally, the surface insert 164 can itself be configured to provide additional functional capabilities through varying surface treatments or textures. The number of available varieties of these surface capabilities can also be expanded by utilizing both sides of the surface insert 164. A supplementary utility surface 166 provides the supplementary utility portion 114 with a supplementary utility area available for providing functional capabilities. As depicted in FIG. 1, the supplementary utility surface 166 is equipped with a plurality of peg holes 168 for inserting a variety of equipment, as well as a plurality of straps 170 that can be used to hold tools or other materials in readiness for use. The particular arrangement of functional capabilities depicted in FIG. 1 are a representative selection shown only for illustrative purposes and are not limiting of the number, variety, or manner of arrangement of functional capabilities that the supplementary utility surface 166, or the supplementary utility portion 114 as a whole, can be provided with. There also can be multiple supplementary utility surfaces 166, as well as multiple surface inserts 164, which can have varying configurations and varying dimensions. Significantly, the supplementary utility surface 166 can also be a locus of direct functional execution, such as a canvas support for a painter, in addition to a locale for the holding of tools. Effectively, the variety of capabilities which the supplementary utility portion 114 can be configured with is as diverse as the variety of capabilities which the base utility portion 112 can be configured with.

Figure 2:
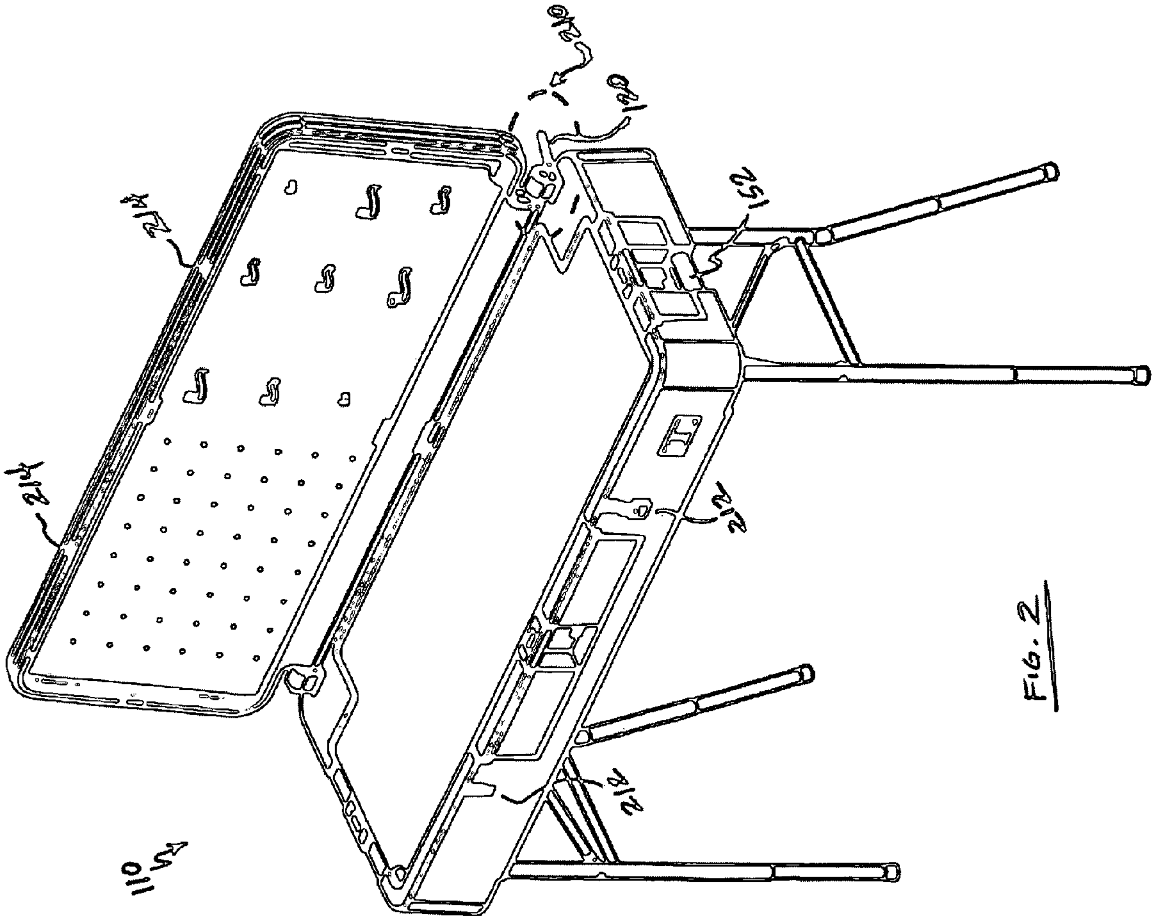
FIG. 2 depicts a perspective view of the first embodiment of the multi-functional utility system in an operative disposition.

In FIG. 2, the first embodiment 110 is shown in an operative disposition, with the drawers 126, 130, and 134 fully received in the base utility portion openings 138, 140, and 142, respectively, and the surface insert 164 is disposed across the base utility portion 112. The supplementary utility surface 166 is disposed across the supplementary utility portion 114, and the pivot control lever 120 has arrested the supplementary utility portion 114 in an operative disposition. The area 210, which includes the right axle housing 118 and the pivot control lever 120, is shown in an expanded, detail view in FIG. 3. Latches 212 are disposed on the front side of the base utility portion 112. The latches 212 cooperate with clasps 214, disposed on the front (front being the relative position when the supplementary utility portion 114 is in the closed disposition) side of the supplementary utility portion 114 to provide a capability of locking the supplementary utility portion 114 in the closed disposition. It should also be understood that the multi-functional utility system is also capable of facilitating utilitarian functions when in the closed disposition. The outer surface of the supplementary utility portion 114 can be configured in a variety of ways that provide utilitarian functions, and the providing of just a single surface, without further capabilities, can also be instrumental in facilitating utilitarian functions. In addition, when the supplementary utility portion 114 is in the closed disposition, the drawers 126, 130, and 134 are still available for use, as is the electrical outlet 156.

Figure 3:
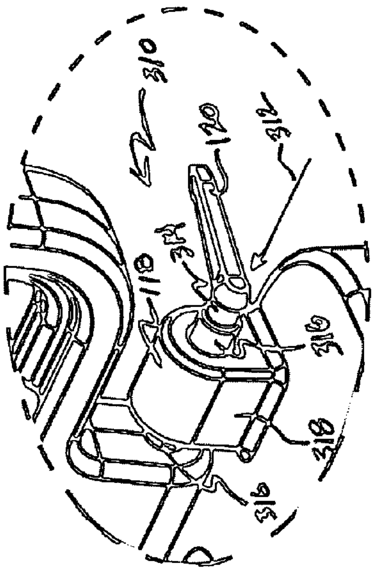
FIG. 3 depicts an expanded detail view of an area 210 of FIG. 2 that includes the pivot control lever 120.
Figure 4:
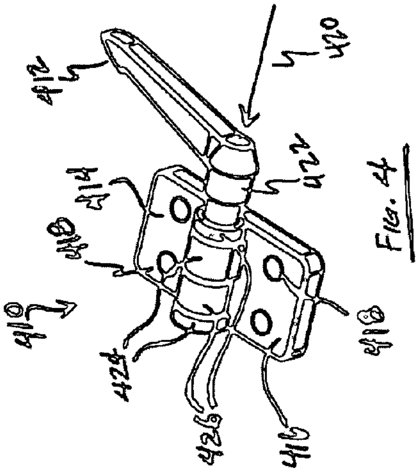
FIG. 4 depicts a "Hold Open Lever Locking Hinge", part no. 1604A41, manufactured by McMaster-Carr®.

In FIG. 3, an expanded view of the right axle housing 118 and the pivot control lever 120 show how a disposition securing assembly 310 capable of arresting the supplementary utility portion 114 in an operative disposition can be integrated into the cooperative interrelation between the base utility portion 112 and the supplementary utility portion 114. The disposition securing assembly 310, as shown in FIGS. 2 & 3 includes an adaptation of the commercially available McMaster-Carr® Hold Open Lever Locking Hinge, catalog # 1604A41, depicted as part 410 in FIG. 4. The pivot control lever 120 is essentially the same as the hinge lever 412 of the McMaster-Carr® Hold Open Lever Locking Hinge 410. The McMaster-Carr© Hold Open Lever Locking Hinge 410 operates by providing a pivoting interrelation between the leaves 414 and 416. One of the leaves, 414 for example, is generally fastened to a door (not shown) by screws threaded through apertures 418, while leaf 416 is fastened to a door frame (not shown) by screws threaded through apertures 418. A rotational axis 420 is directed along the longitudinal length of the McMaster-Carr® Hold Open Lever Locking Hinge 410, which has a rotational axle 422 that terminates at one end in the hinge lever 412. Leaf 416 is in a fixed relationship with barrel sections 424, and leaf 414 is in a fixed relationship with barrel sections 426. The barrel sections 424 and 426 are capable of rotating about the axis 420, but will rotate in opposite directions when the McMaster-Carr® Hold Open Lever Locking Hinge 410 is pivoting. The physical configurations of the leaves 414 and 416 can be altered without impairing or significantly altering the operation of the McMaster-Carr® Hold Open Lever Locking Hinge 410. For the adaptation for use as the disposition securing assembly 310, the leaves 414 and 416 will be altered in form, but not in functional relationship. In the disposition securing assembly 310, the barrel sections 424 and 426, the hinge lever 412 (becoming the pivot control lever 120 when adapted) and the rotational axle 422 (now rotating about axis 312 and becoming the rotational axle 314 of the disposition securing assembly 120) remain in substantially the same relationship as they had in the McMaster-Carr® Hold Open Lever Locking Hinge 410. The primary modifications are to the forms of the leaves 414 and 416. The leaf 414, which remains in a fixed relationship with barrel sections 426, is transformed into a rotating hub 316, that is concentric about the rotational axle 314. The leaf 416, which remains in a fixed relationship with barrel sections 424, is transformed into an integrated, fixed relationship (not shown) with the base utility portion axle housings 118. The rotating hub 316 passes through the base utility portion axle housings 118 and extends inward to a fixed relationship with the supplementary utility portion 114. In operation, the rotating hub 316 and the transformed leaf 416 rotate about axle 314 in opposite directions. Because the rotating hub 316 is in a fixed relationship with the supplementary utility portion 114; and the transformed leaf 416 is in a fixed relationship with the base utility portion axle housing 118, and hence a fixed relationship with the base utility portion 114; rotation of the rotating hub 316 and the transformed leaf 416 about the axle 314 provides for a rotational relationship between the base utility portion 112 and the supplementary utility portion 114. The pivot control lever 120 can then operate in a comparable manner as the hinge lever 412 to provide the capability of selectively arresting the rotation of the supplementary utility portion 114, relative to the base utility portion 112, when the supplementary utility portion 114 is in the operative disposition. The adaptation of the McMaster-Carr® Hold Open Lever Locking Hinge 410 to utilization as the disposition securing assembly 310 is representative of, but not limiting of the variety of means by which the selective arresting of the relative rotation of the supplementary utility portion 114 can be effected. It is well understood by those of skill in the art that a substantial assortment of mechanisms can provide similar functions, and the adaptation of any other means capable of functioning in this manner is also within the scope of the present invention.

Figure 6:
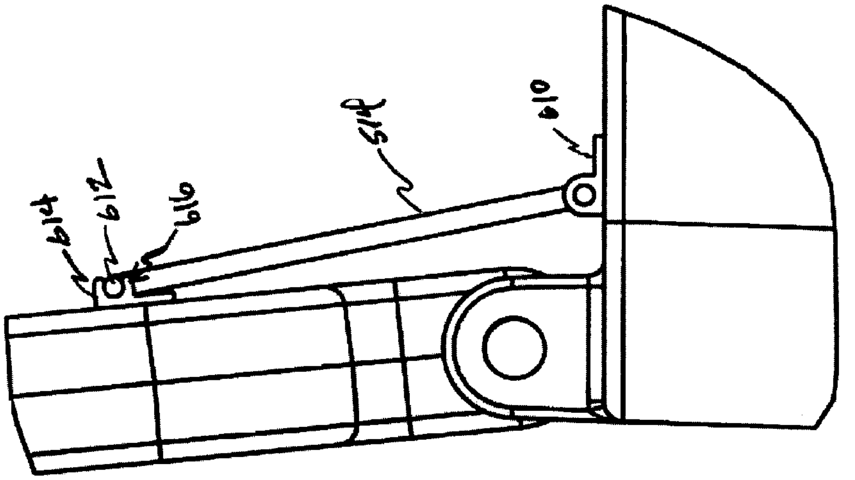
FIG. 6 depicts an expanded detail view of an area 512 of FIG. 5.
Figure 5:
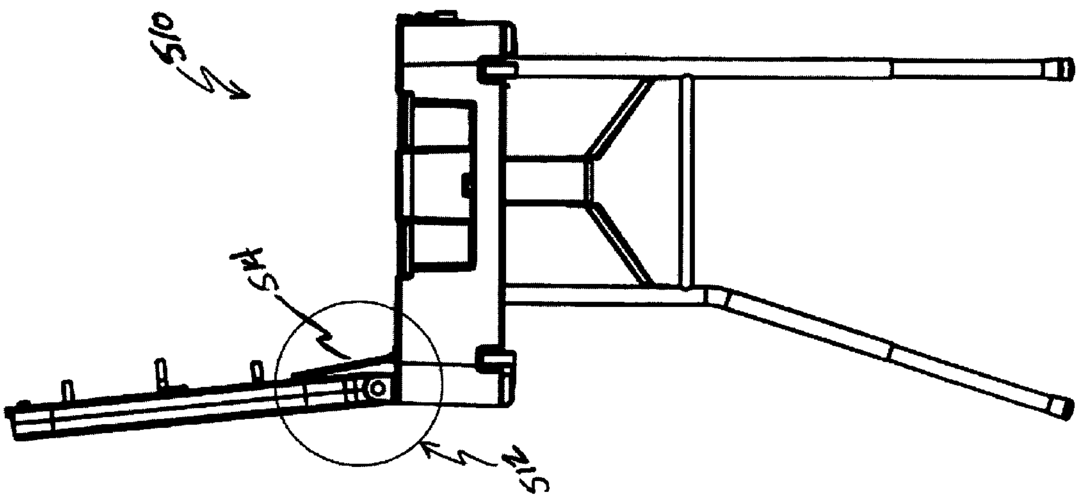
FIG. 5 depicts a side view of a second embodiment of the multi-functional utility system in an operative disposition.

In FIG. 5 a second embodiment 510 of the multi-functional utility system is shown from the left side with the second embodiment 510 in an operative disposition. The second embodiment 510 primarily differs from the first embodiment 110 in the means by which the second embodiment 510 arrests the rotation of the supplementary utility portion 114, when the supplementary utility portion 114 is in an operative disposition. The area 512, which is shown in an expanded detail view in FIG. 6, includes a retaining strut 514 with which the second embodiment 510 arrests the rotation of the supplementary utility portion 114. In FIG. 6 the retaining strut 514 is shown from the left side, arranged in a disposition in which it arrests the rotation of the supplementary utility portion 114. The retaining strut 514 is pivotally connected to a strut anchor 610 which is affixed to the base utility portion 112 of the second embodiment 510. Located substantially at the end of the retaining strut 510 that is opposite of the end pivotally connected to the strut anchor 610 is a rounded strut flange 612. The strut flange 612 is received within a catch notch 616 formed in the strut catch 614. The catch notch 616 is configured to allow the strut flange to be selectively pushed into or pulled from the catch notch 616, and is also configured to hold the strut flange 612 within the catch notch 616 unless the strut flange 612 is pulled from the catch notch 616.

Figure 7:
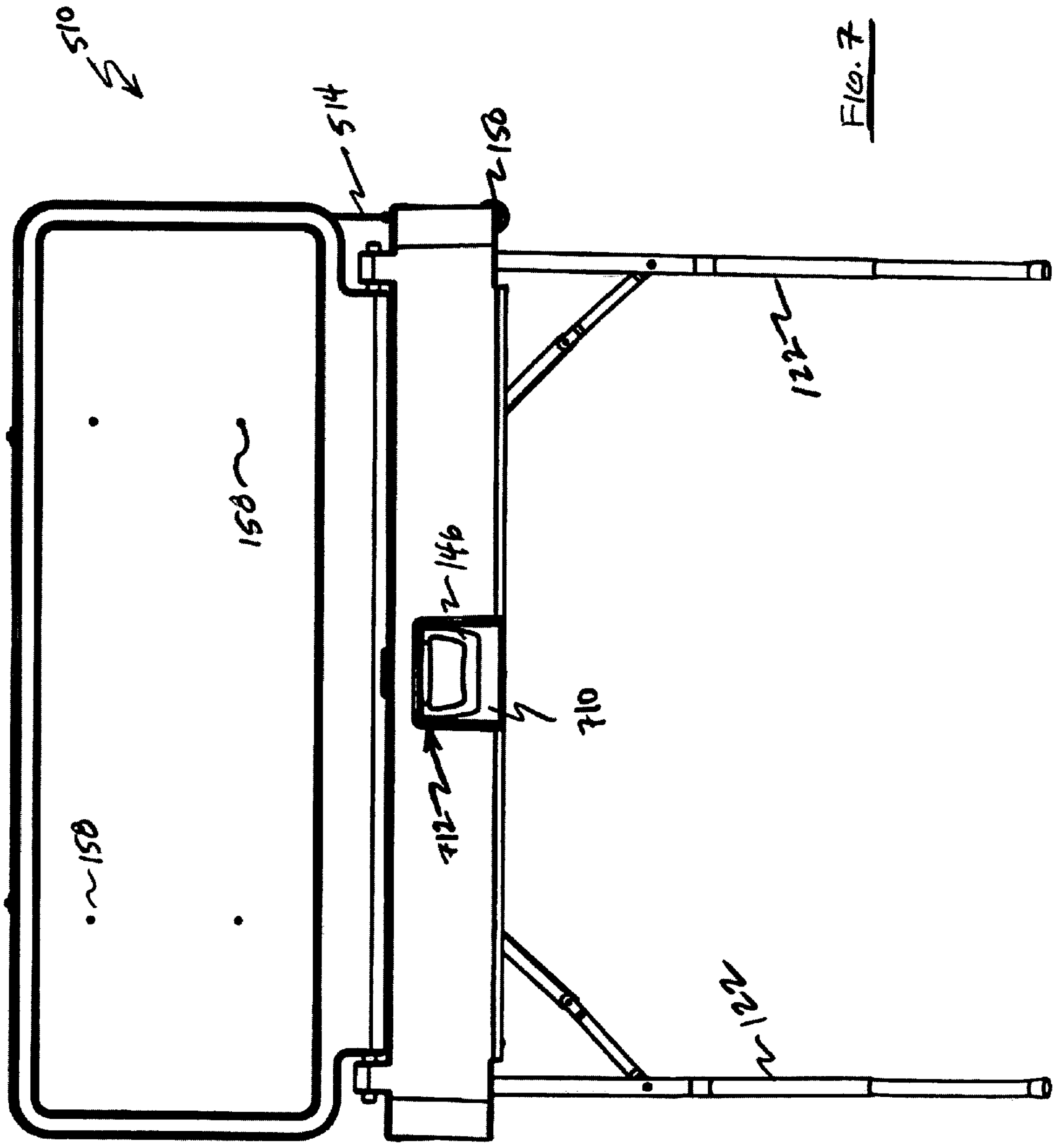
FIG. 7 depicts a rear view of the second embodiment of the multi-functional utility system in an operative disposition.

In FIG. 7, a rear view of the second embodiment 510 is shown in an operative disposition with the folding legs 122 unfolded to support the second embodiment 510. The retaining strut 514 is inserted within the catch notch 616 (not shown). The handle 146 fits within a handle recess 710 and is pivotally anchored at its top side 712 to the base utility portion 112. The holes 158 are seen to extend through the supplementary utility portion 114, so that attachments to another structure from the rear can be made. The assembled disposition of the wheels 150 is seen to be partially recessed and to be partially extending beyond the rear profile of the second embodiment 510 so that when the second embodiment 510 is at a diagonal angle to the ground, with the right side downward and the folding legs 122 folded up, the second embodiment 510 will rest on the wheels 150.

Figure 8:
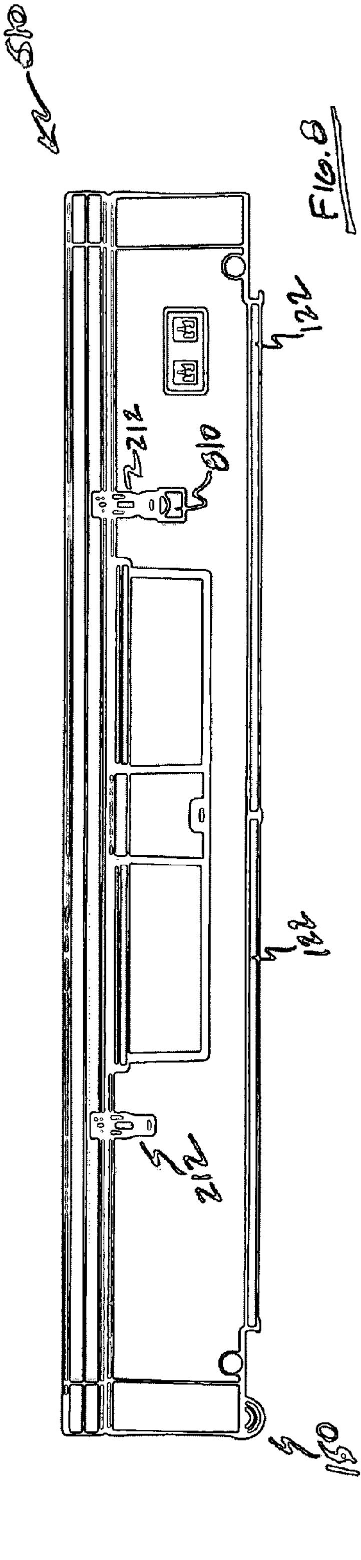
FIG. 8 depicts a front view of the second embodiment of the multi-functional utility system in a closed disposition.
Figure 9:
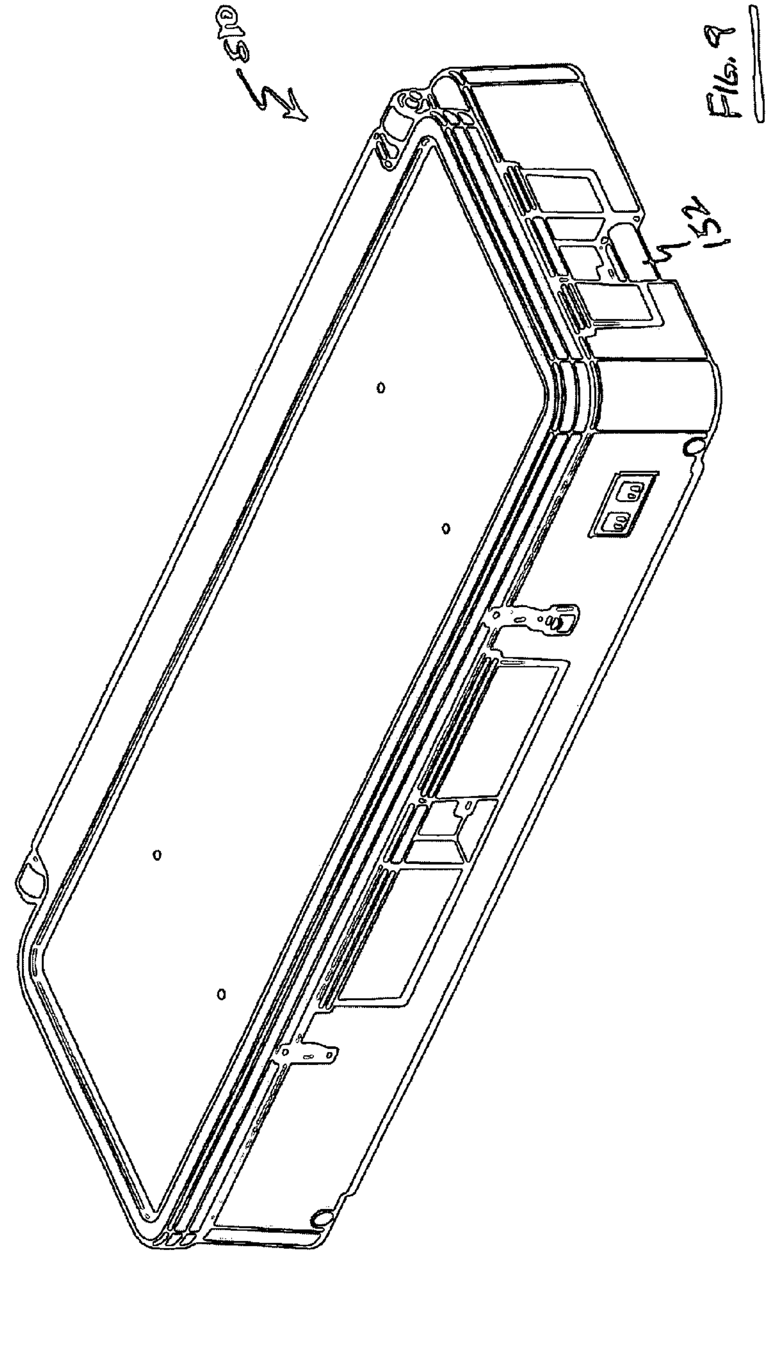
FIG. 9 depicts a perspective view of the second embodiment of the multi-functional utility system in a closed disposition.

In FIGS. 8 & 9, the second embodiment 510 is shown in a closed disposition from a front and a perspective view, respectively. In FIG. 8, with the folding legs 122 fully folded, it can be clearly seen that the wheels 150 are arranged so as to provide the capacity to roll the second embodiment 510 upon the wheels 150 by holding the second embodiment 510 at an upward angle, from left to right. The grip 152 disposed on the opposite side of the wheels 150 can be seen in FIG. 9 to provide a suitable handhold for transporting the second embodiment 510 by rolling on the wheels 150. An optional lock 810 is engaged with the right latch 212 to prevent unauthorized access to the interior of the second embodiment 510. In FIG. 9 it can also be seen that the outer surface of the supplementary utility portion 114 provides a broad region that can be adapted to provide additional utilitarian functions.

Figure 10:
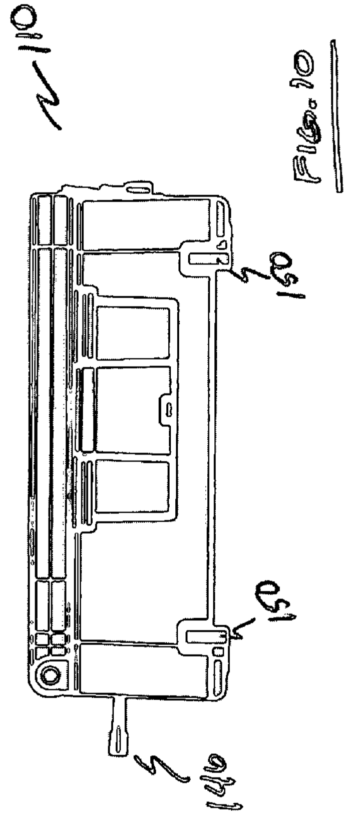
FIG. 10 depicts a left side view of a second embodiment of the multi-functional utility system in a closed disposition.

In FIG. 10, a view from the left side of the first embodiment 110 in a closed disposition with the legs 122 fully folded shows the partially recessed wheels 150, and the handle 146 suitably positioned for grasping. The disposition of the wheels 150 is just one embodiment's option for facilitating the transporting of the present invention. Additional means of utilizing wheels to facilitate transportation include the employment of larger wheels (not shown) that can also be disposed in the general vicinity of where the wheels 150 are disposed. These larger wheels can be a permanent installation, or a detachable component, and can be particularly well suited to provide capabilities of easing the transportation of the present invention in settings that do not provide smooth surfaces for rolling upon. Additionally, the legs 122 can be alternatively configured with a mechanism similar to those of ambulance gurneys (not shown). In this embodiment, the legs would provide the options of both selectively deploying embodiments of the multi-functional utility system at varying heights, as well as provide the capability of rolling the multi-functional utility system on the wheels of such a gurney support. Rolling the present invention on gurney support wheels could be effected whether or not the gurney supports are extended, and even on just a fraction of the gurney support wheels in combination with the grip 152.

Figure 11:
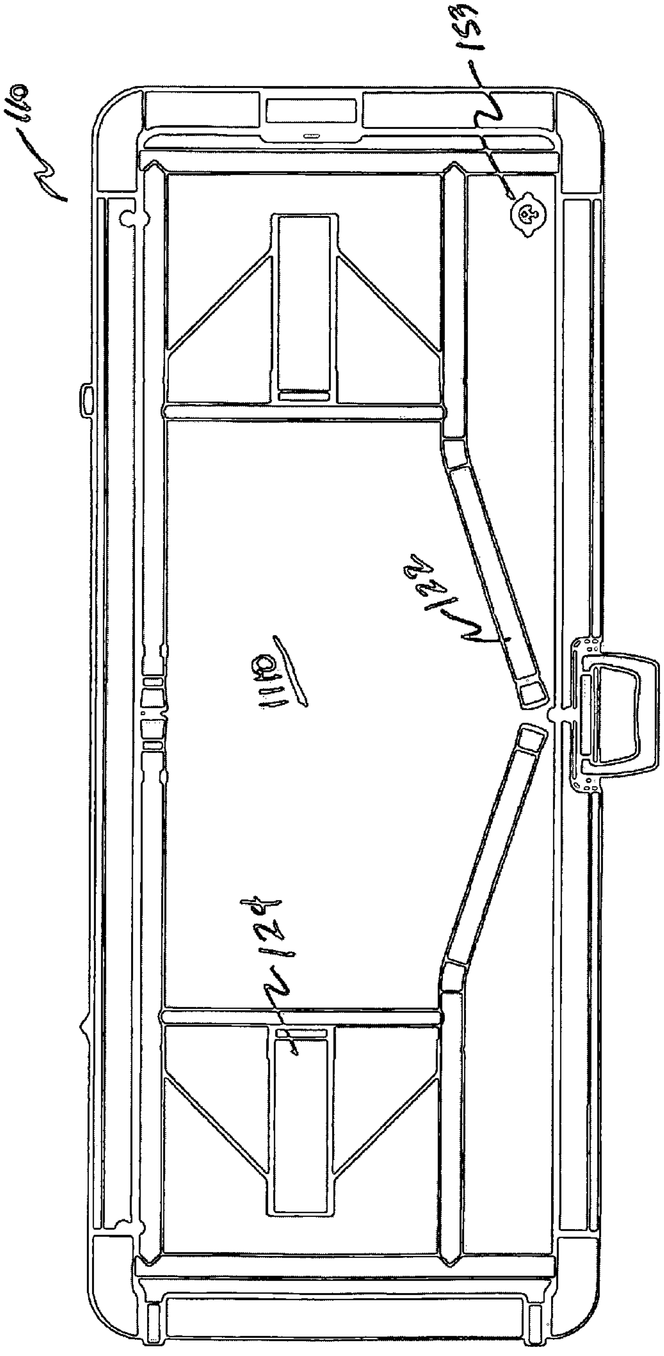
FIG. 11 depicts an underside view of the first embodiment of the multi-functional utility system with the support legs in a closed disposition.

In FIG. 11, a view from below of the first embodiment 110 shows the disposition of the legs 122 when fully folded. The bottom surface of the base utility portion 112 can be configured to provide a depressed region 1110 that the legs 122 can be folded up into. The relative placement of the male electrical connection 153 can also be best seen in FIG. 11.

In view of the above, and in view of the claims following, it will be seen that the various objects and features of the invention are achieved and other advantageous results obtained. The examples contained herein are merely illustrative and are not intended in a limiting sense.

What is claimed is:

1. A multi-functional work center comprising:

a base and a lid, said base including a base work area and said lid including a lid work area, each of said base and lid work areas capable of being used to facilitate at least one work function, said lid being pivotally interrelated with said base, said pivotal interrelation enabling the lid to assume a closed disposition and at least one operative disposition, the at least one operative disposition of the lid providing concurrent capabilities of utilizing the base work area and the lid work area, and the closed disposition of the lid providing capabilities of readily transporting the multi-functional work center;

a lid disposition securing assembly capable of securing the lid at an angle between 0 and 180 degrees relative to its orientation when in the closed disposition;

at least two drawers supported by the base and movable relative to the base between at least one extended position and a stowed position, each drawer being associated with a drawer lid, each drawer lid being movable relative to its drawer and relative to the base, and each drawer lid being capable of functioning as an independent work area when its drawer is in the at least one extended position;

wheels coupled to a first edge portion of the base, the wheels being rotatable relative to the base;

a grip included in a second edge portion of the base opposite the first edge portion, the grip and the wheels cooperating for use in transporting the multi-functional work center when the lid is in the closed disposition; and legs coupled to the base and moveable relative to the base between a folded position and an unfolded position, the legs operating to support the base above a surface when in the unfolded position.

2. The multi-functional work center according to claim 1, further comprising a power system capable of receiving power from a power source external to the multi-functional work center.

3. The multi-functional work center of claim 1, wherein the legs are adjustable for supporting the base at multiple different distances above the surface when in the unfolded position.

4. The multi-functional work center according to claim 1, wherein at least one of the drawer lids is configured to extend from the base when the drawer associated with said at least one drawer lid is in the stowed position.

5. The multi-functional work center according to claim 1, wherein the lid includes openings for use in anchoring the lid to a surface such that the base is moved adjacent the surface when the lid is in the closed disposition.

6. The multi-functional work center according to claim 1, wherein the lid disposition securing assembly is capable of securing the lid at an angle greater than 0 degrees and less than 90 degrees relative to the base.

7. A multi-functional work center comprising:

a base and a lid, said base including a base work area and said lid including a lid work area, each of said base and lid work areas capable of being used to facilitate at least one work function, said lid being pivotally interrelated with said base, said pivotal interrelation enabling the lid to assume a closed disposition and at least one operative disposition, the at least one operative disposition of the lid providing concurrent capabilities of utilizing the base work area and the lid work area, and the closed disposition of the lid providing capabilities of readily transporting the multi-functional work center;

a lid disposition securing assembly capable of securing the lid at an angle between 0 and 180 degrees relative to its orientation when in the closed disposition;

at least two drawers supported by the base and movable relative to the base between at least one extended position and a stowed position, each drawer being associated with a drawer lid, each drawer lid being movable relative to its drawer and relative to the base, and each drawer lid being capable of functioning as an independent work area when its drawer is in the at least one extended position;

wheels coupled to a first edge portion of the base, the wheels being rotatable relative to the base; and a grip included in a second edge portion of the base opposite the first edge portion, the grip and the wheels cooperating for use in transporting the multi-functional work center when the lid is in the closed disposition;

wherein the lid includes openings for use in anchoring the lid to a surface such that the base is moved adjacent the surface when the lid is in the closed disposition.

8. A multi-functional work center comprising:

a base and a lid, said base including a base work area and said lid including a lid work area, each of said base and lid work areas capable of being used to facilitate at least one work function, said lid being pivotally interrelated with said base, said pivotal interrelation enabling the lid to assume a closed disposition and at least one operative disposition, the at least one operative disposition of the lid providing concurrent capabilities of utilizing the base work area and the lid work area, and the closed disposition of the lid providing capabilities of readily transporting the multi-functional work center;

a lid disposition securing assembly capable of securing the lid at an angle between 0 and 180 degrees relative to its orientation when in the closed disposition;

at least two drawers supported by the base and movable relative to the base between at least one extended position and a stowed position, at least one of the at least two drawers being associated with a drawer lid, the drawer lid being movable relative to its drawer and relative to the base, and the drawer lid being capable of functioning as an independent work area when its drawer is in the at least one extended position;

wheels coupled to a first edge portion of the base, the wheels being rotatable relative to the base;

a grip included in a second edge portion of the base opposite the first edge portion, the grip and the wheels cooperating for use in transporting the multi-functional work center when the lid is in the closed disposition; and legs coupled to the base and moveable relative to the base between a folded position and an unfolded position, the legs operating to support the base above a surface when in the unfolded position.

9. A multi-functional work center comprising:

a base and a lid, said base including a base work area and said lid including a lid work area, each of said base and lid work areas capable of being used to facilitate at least one work function, said lid being pivotally interrelated with said base, said pivotal interrelation enabling the lid to assume a closed disposition and at least one operative disposition, the at least one operative disposition of the lid providing concurrent capabilities of utilizing the base work area and the lid work area, and the closed disposition of the lid providing capabilities of readily transporting the multi-functional work center;

a lid disposition securing assembly capable of securing the lid at an angle between 0 and 180 degrees relative to its orientation when in the closed disposition;

at least two drawers supported by the base and movable relative to the base between at least one extended position and a stowed position, at least one of the at least two drawers being associated with a drawer lid, the drawer lid being movable relative to its drawer and relative to the base, and the drawer lid being capable of functioning as an independent work area when its drawer is in the at least one extended position; and a grip for use in transporting the multi-functional work center when the lid is in the closed disposition;

wherein the lid includes openings for use in anchoring the lid to a surface such that the base is moved adjacent the surface when the lid is in the closed disposition.

* * * * *